(12) United States Patent
Iwabuchi

(10) Patent No.: US 9,277,312 B2
(45) Date of Patent: Mar. 1, 2016

(54) ELECTRONIC DEVICE WITH BONE CONDUCTION VIBRATOR

(71) Applicant: KYOCERA Corporation, Fushimi-ku, Kyoto-shi, Kyoto (JP)

(72) Inventor: Masaru Iwabuchi, Itami (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/382,306

(22) PCT Filed: Dec. 16, 2013

(86) PCT No.: PCT/JP2013/083631
§ 371 (c)(1),
(2) Date: Aug. 29, 2014

(87) PCT Pub. No.: WO2014/098031
PCT Pub. Date: Jun. 26, 2014

(65) Prior Publication Data
US 2015/0023528 A1   Jan. 22, 2015

(30) Foreign Application Priority Data

Dec. 18, 2012 (JP) .................................. 2012-275662

(51) Int. Cl.
*H04R 25/00* (2006.01)
*H04R 1/46* (2006.01)
(Continued)

(52) U.S. Cl.
CPC .................. *H04R 1/46* (2013.01); *H04R 1/025* (2013.01); *G06F 3/016* (2013.01); *H04M 1/026* (2013.01); *H04M 1/03* (2013.01); *H04R 2460/13* (2013.01); *H04R 2499/11* (2013.01)

(58) Field of Classification Search
CPC .. H04R 7/04; H04R 2499/11; H04R 2499/15; G06F 3/106; G06F 3/016
See application file for complete search history.

(56) References Cited

U.S. PATENT DOCUMENTS 8,090,124 B2 * 1/2012 Nakagawa .......... H04M 1/0266
381/152
8,259,930 B2 * 9/2012 Kawasaki ............... H04M 1/02
379/433.04
(Continued)

FOREIGN PATENT DOCUMENTS

JP    2001-320790 A    11/2001
JP    2003-145048 A     5/2003
(Continued)

OTHER PUBLICATIONS

International search report dated Jan. 21, 2014 issued for corresponding Internation application No. PCT/JP2013/083631.
(Continued)

*Primary Examiner* — Curtis Kuntz
*Assistant Examiner* — Ryan Robinson
(74) *Attorney, Agent, or Firm* — Procopio, Cory, Hargreaves & Savitch LLP

(57) ABSTRACT

An electronic device includes: a main body; a screen panel disposed on a surface of the main body and configured to display an image; a frame-shaped cover panel disposed on the surface of the main body to cover an outer periphery of the screen panel; a bone conduction vibrator incorporated in the main body and attached to a rear surface of the screen panel, and an adhesive layer fixedly attaching the cover panel at a rear surface thereof to an outer peripheral portion of the surface of the screen panel. The adhesive layer extends along the outer peripheral portion of the surface of the screen panel and has a missing portion in which an area to be located in the vicinity of the bone conduction vibrator is missing. The missing portion-provides a gap between the surface of the screen panel and the rear surface of the cover panel.

5 Claims, 5 Drawing Sheets

B-B CROSS SECTION

(51) Int. Cl.
*H04R 1/02* (2006.01)
*G06F 3/01* (2006.01)
*H04M 1/03* (2006.01)
*H04M 1/02* (2006.01)

(56) References Cited

U.S. PATENT DOCUMENTS

| | | | | |
|---|---|---|---|---|
| 8,816,981 | B2 * | 8/2014 | Kai | G06F 1/1626 345/173 |
| 2004/0028249 | A1 | 2/2004 | Asnes | |
| 2011/0128236 | A1 * | 6/2011 | Faubert | G06F 3/016 345/173 |
| 2013/0038561 | A1 | 2/2013 | Ujii et al. | |
| 2013/0129958 | A1 * | 5/2013 | Li | G02B 27/00 428/41.7 |
| 2013/0250502 | A1 * | 9/2013 | Tossavainen | G06F 3/016 361/679.01 |

FOREIGN PATENT DOCUMENTS

| | | | |
|---|---|---|---|
| JP | 2012-044245 A | 3/2012 | |
| JP | 2012-138119 A | 7/2012 | |
| WO | 2009072237 A1 | 6/2009 | |
| WO | 2012096113 A1 | 7/2012 | |
| WO | WO 2012111349 A1 * | 8/2012 | ............. G06F 3/041 |
| WO | 2012-117738 A1 | 9/2012 | |

OTHER PUBLICATIONS

Written Opinion of the International Searching Authority dated Jan. 21, 2014 issued in counterpart International application No. PCT/JP2013/083631.

Office Action dated Apr. 21, 2015 issued in counterpart Japanese application No. 2014-152577.

* cited by examiner

A-A CROSS SECTION

ELECTRONIC DEVICE WITH BONE CONDUCTION VIBRATOR

TECHNICAL FIELD

The present invention relates to electronic devices, such as cell phones, including a bone conduction vibrator for transmitting audio to an ear of a call recipient by bone conduction.

BACKGROUND ART

Various electronic devices have been proposed which include a bone conduction vibrator. For example, in a cell phone, a receiver configured by a bone conduction vibrator is disposed at an upper end of a main body while a transmitter configured by a microphone is disposed at a lower end of the main body, such that a call is established with the receiver pressed against an ear and the transmitter brought close to the mouth.

In a cell phone with a screen panel for image display disposed on a surface of a main body, it is conceivable to configure a receiver in such a way that a bone conduction vibrator is attached to a rear surface of the screen panel.

With such a cell phone, a surface of the screen panel is pressed against an ear, such that a call is established by way of bone conduction.

In such a cell phone, however, a frame-shaped cover panel is fixedly arranged on the surface of the main body to cover the outer periphery of the screen panel. Thus, the cover panel suppresses the vibration of the screen panel, causing lowering of bone conduction performance of the bone conduction vibrator.

It is thus desired to inhibit lowering of bone conduction performance in electronic devices that have a bone conduction vibrator incorporated therein and a cover panel arranged to cover the outer periphery of a screen panel.

SUMMARY OF THE INVENTION

An electronic device according to the present invention includes: a main body; a screen panel disposed on a surface of the main body and configured to display an image; a frame-shaped cover panel disposed on the surface of the main body to cover an outer periphery of the screen panel; a bone conduction vibrator incorporated in the main body and attached to a rear surface of the screen panel, the bone conduction vibrator being configured to transmit audio by bone conduction; and an adhesive layer fixedly attaching the cover panel at a rear surface thereof to an outer peripheral portion of a surface of the screen panel. The adhesive layer extends along the outer peripheral portion of the surface of the screen panel and has a missing portion in which an area to be located in the vicinity of the bone conduction vibrator is missing. The missing portion in the adhesive layer provides a gap between the surface of the screen panel and the rear surface of the cover panel.

DETAILED DESCRIPTION OF EMBODIMENT

An embodiment of the present invention in the form of a cell phone is specifically described below with reference to the drawings.

Figure 1:
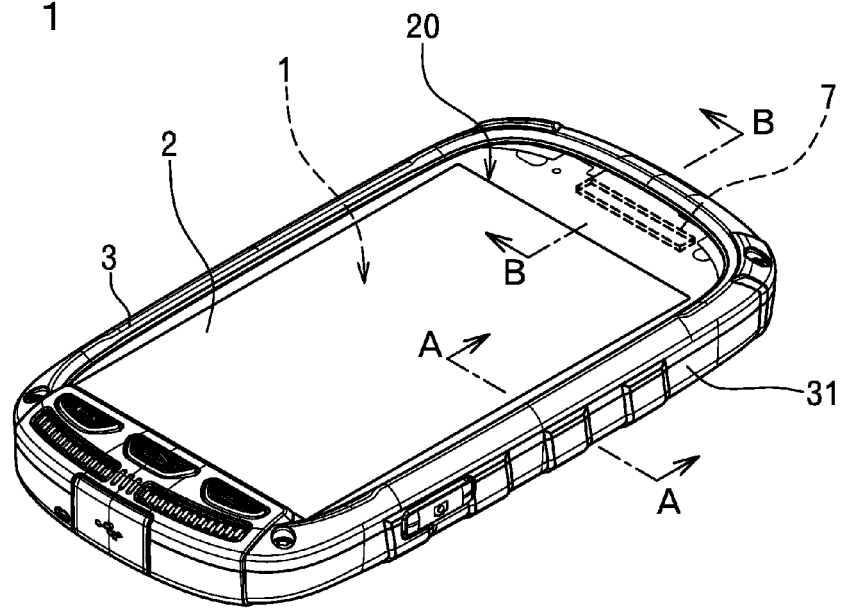
FIG. 1 is a perspective view of a cell phone according to an embodiment of the present invention.

As illustrated in FIG. 1, a cell phone according to an embodiment of the present invention includes a flat rectangular main body 1 and a display screen 20. A transparent screen panel 2 is placed on a surface of the main body 1. A frame-shaped front cover panel 3 is disposed on the front side of the main body 1 to cover the outer periphery of the screen panel 2. A back cover panel 31 is disposed on the back side of the main body 1. The front cover panel 3 and the back cover panel 31 are joined together.

The front cover panel 3 and the back cover panel 31 are made of a synthetic resin.

Figure 2:
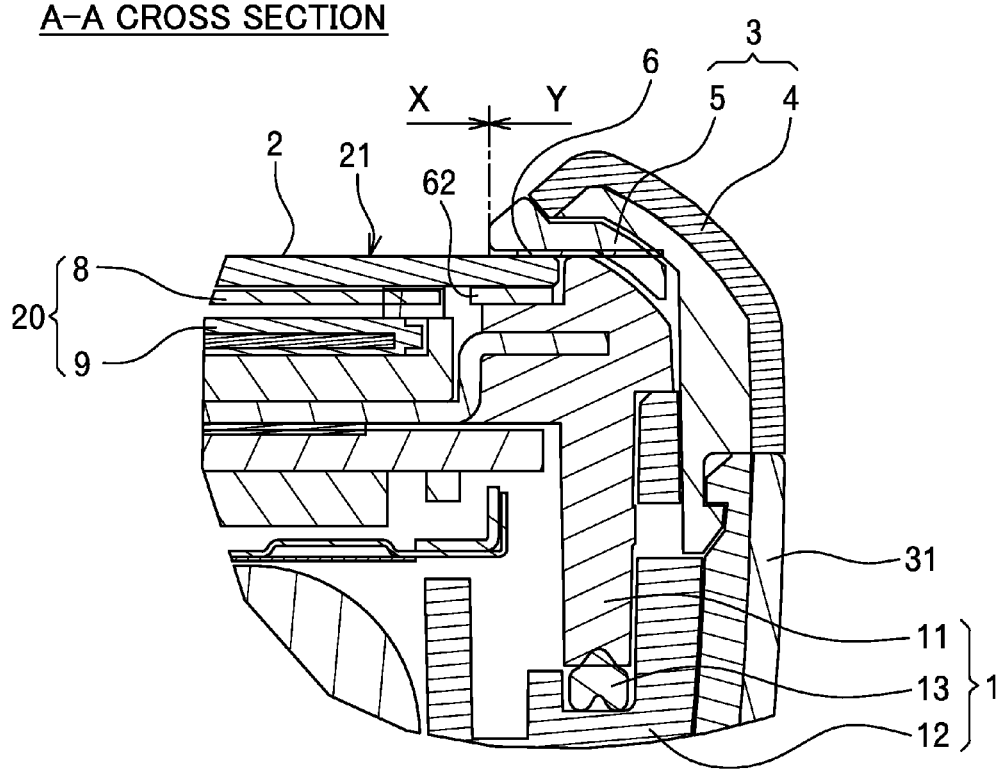
FIG. 2 is an enlarged cross-sectional view of FIG. 1 taken along line A-A.

As illustrated in FIG. 2, the main body 1 has a touch panel 8 for touch input placed on the back side of the screen panel 2 and also has a display 9 for displaying images in the screen panel 2 placed on the back side of the touch panel 8, so as to configure the display screen 20.

Touch operation is performed, in response to an image displayed on a surface of the screen panel 2, at display positions of the image, such that operation signals corresponding to the image are generated.

The main body 1 includes a front side main body chassis 11 and a back side main body chassis 12 that are made of a synthetic resin and are joined together with a waterproof gasket 13. The waterproof gasket 13 is for protecting the internal space of the main body 1 from water.

The screen panel 2 is fixedly attached at the back side thereof to a surface of the front side main body chassis 11 by a double-coated adhesive tape 62.

Figure 3:
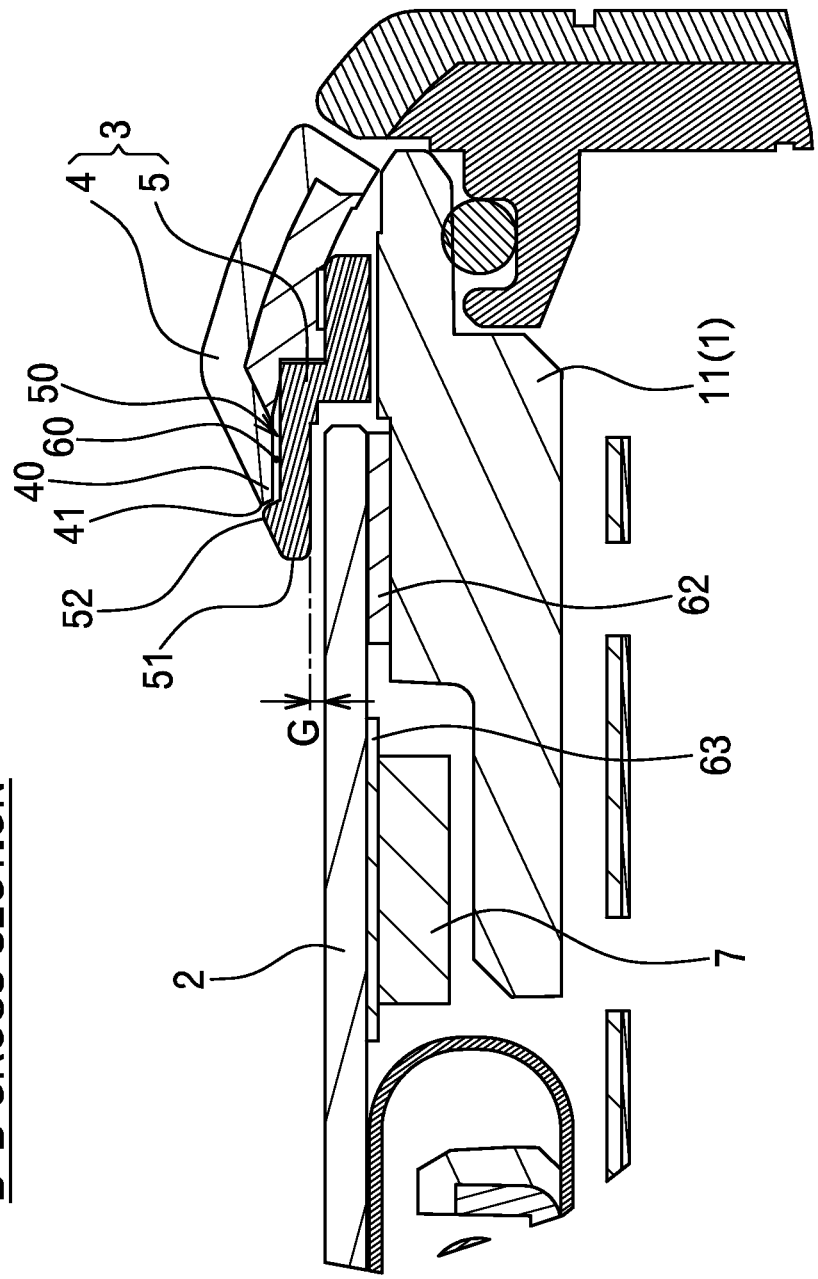
FIG. 3 is an enlarged cross-sectional view of FIG. 1 taken along line B-B.
Figure 4:
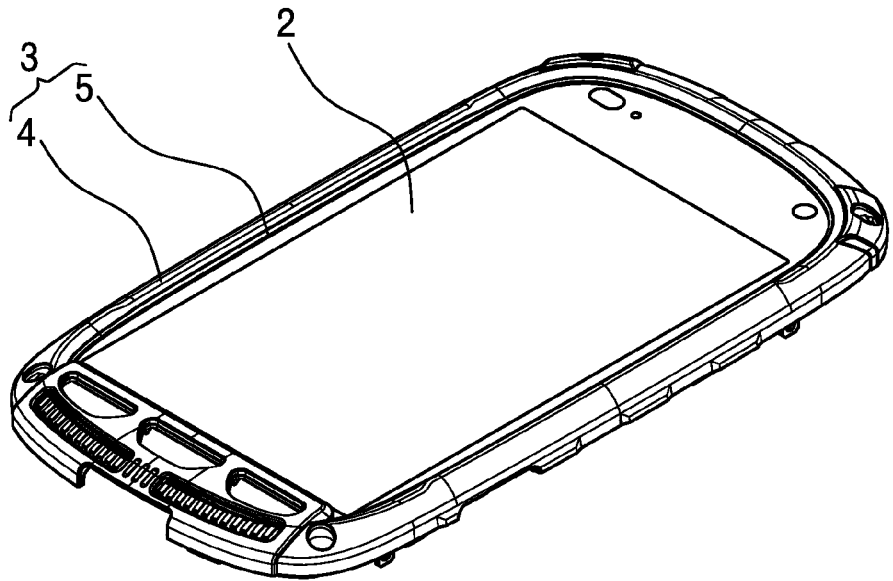
FIG. 4 is a perspective view of a screen panel and a front cover panel.
Figure 5:
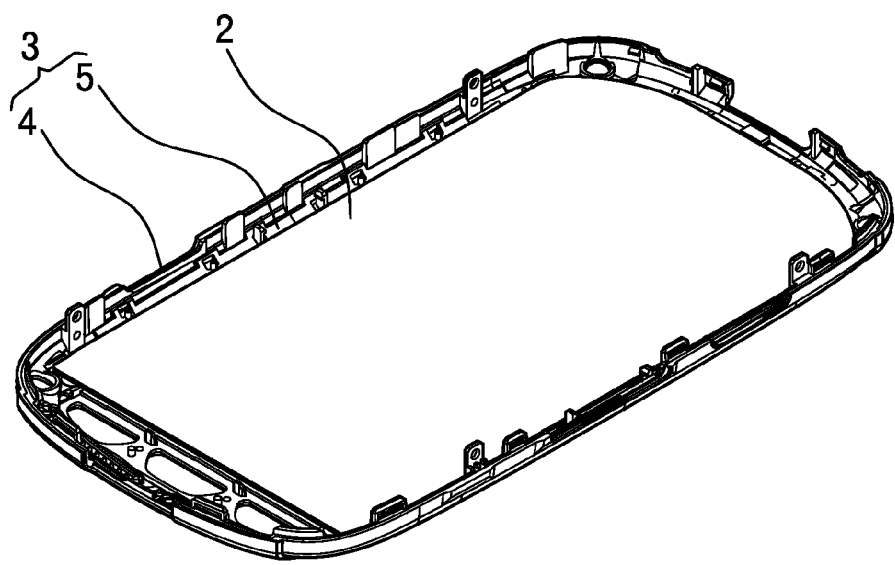
FIG. 5 is a perspective view of the screen panel and the front cover panel shown turned over.

As illustrated in FIGS. 4 to 7, the front cover panel 3 includes a frame-shaped first panel member 4 that covers the outer periphery of the screen panel 2 and a second panel member 5 that extends along a rear surface of the first panel member 4. As illustrated in FIG. 3, an inner peripheral portion 40 of the first panel member 4 is fixedly attached at a rear surface thereof to a surface 50 of the second panel member 5 by using an adhesive 60.

The second panel member 5 has an inner peripheral portion 51 that extends further from an inner peripheral edge 41 of the first panel member 4 toward a central portion of the screen panel 2. An upright wall 52 is provided on a surface of the inner peripheral portion 51 at a portion opposing the inner peripheral edge 41 of the first panel member 4. The upright wall 52 is higher than the surface 50 on which the inner peripheral portion 40 of the first panel member 4 is fixedly bonded.

The appearance of the cell phone can be improved by treating the surface of the inner peripheral portion 51 of the second panel member 5 with metal plating.

A bone conduction vibrator 7 for transmitting receiving call audio by bone conduction is fixedly attached to a rear surface of the screen panel 2 by using a double-coated adhesive tape 63, so as to configure a receiver. The bone conduction vibrator 7 is configured by, for example, a piezoelectric device.

As illustrated in FIG. 1, the bone conduction vibrator 7 is located in an upper portion of the main body 1 on the outer side of the display screen 20 of the screen panel 2.

As illustrated in FIG. 2, the second panel member 5 of the cover panel 3 is adhesively secured at a rear surface thereof in an outer peripheral area Y of the surface of the screen panel 2 by using a double-coated adhesive tape 6.

Figure 6:
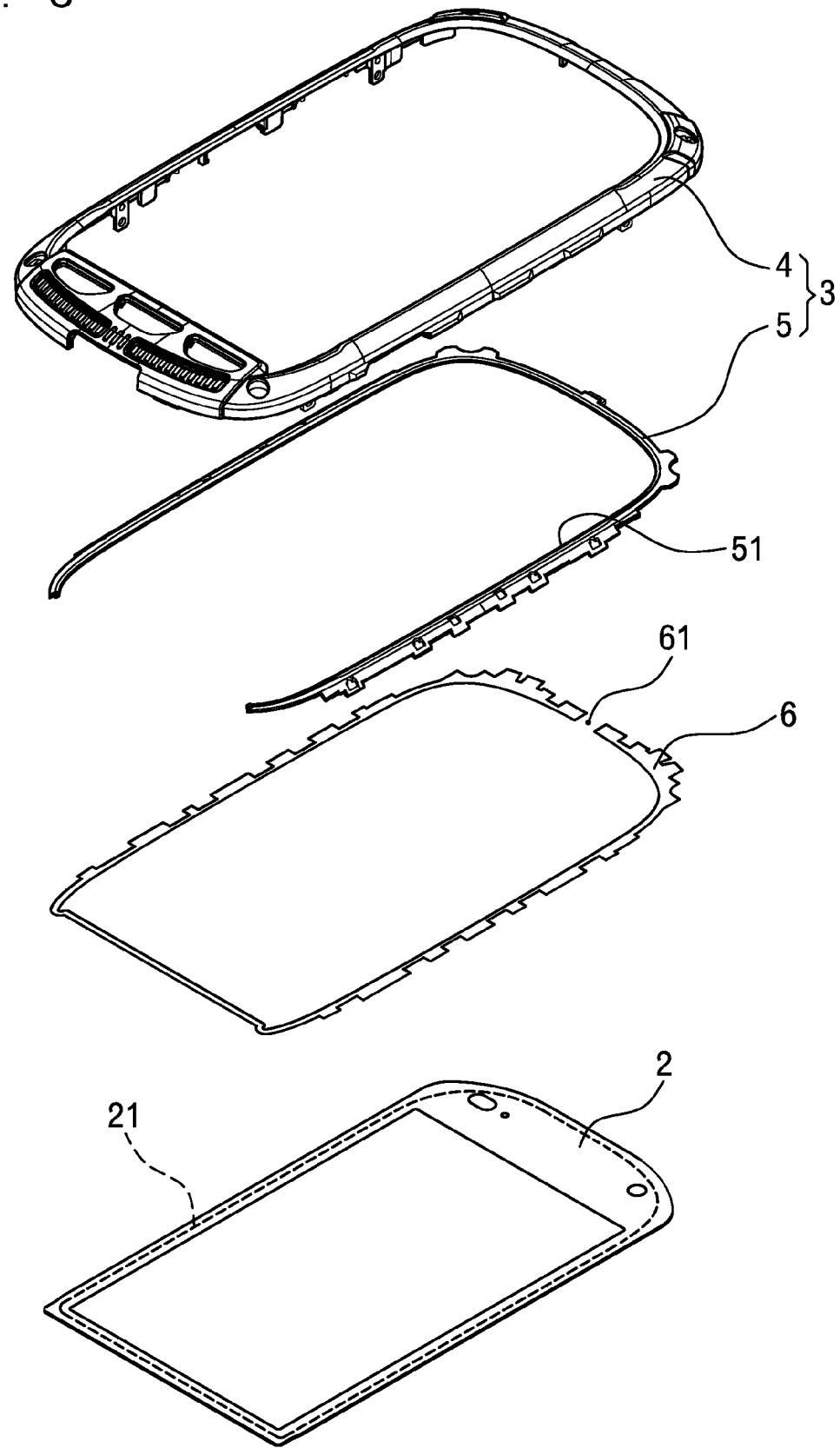
FIG. 6 is an exploded perspective view corresponding to FIG. 4.
Figure 7:
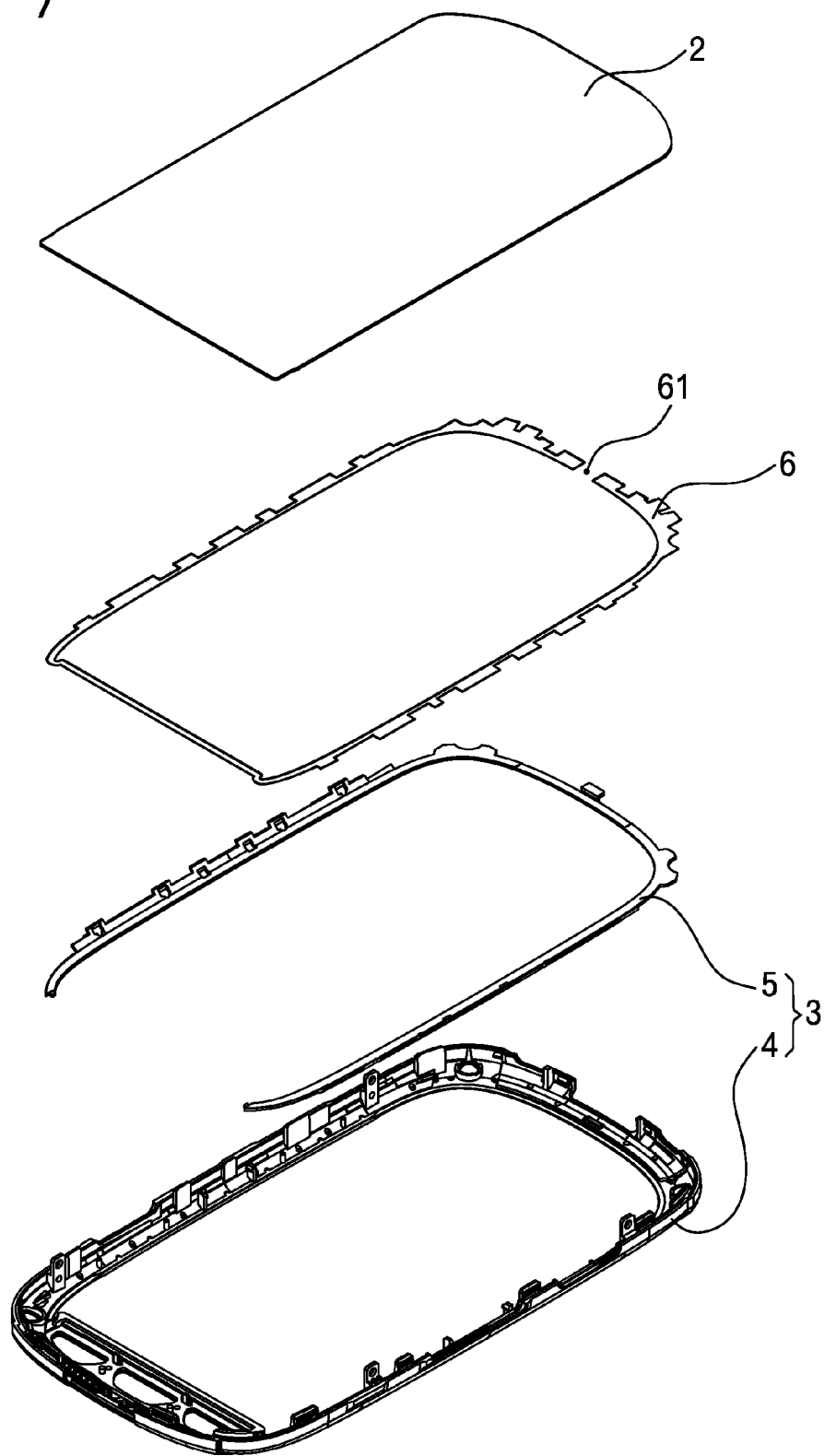
FIG. 7 is an exploded perspective view corresponding to FIG. 5.

As illustrated in FIGS. 6 and 7, the double-coated adhesive tape 6 extends along the outer periphery of the screen panel 2 and has a missing portion 61 in which an area to be located in the vicinity of the bone conduction vibrator 7 is missing. The missing portion 61 separates the double-coated adhesive tape 6.

As illustrated in FIG. 3, this missing portion 61 in the double-coated adhesive tape 6 provides a gap G between the surface of the screen panel 2 and a rear surface of the cover panel 3 in the vicinity of the bone conduction vibrator 7.

The gap G is set to a dimension, for example, on an order of 0.2 mm, that allows for preventing the surface of the screen panel 2 to be vibrated upon driving of the bone conduction vibrator 7 from contacting the rear surface of the front cover panel 3.

Further, as illustrated in FIG. 2, an anti-soil coating 21 is vapor deposited on the surface of the screen panel 2 over a central area X excluding the outer peripheral area Y applied with the double-coated adhesive tape 6.

This suppresses smearing of the surface of the screen panel 2.

In the above-described cell phone, vibration occurs along the screen panel 2 when the bone conduction vibrator 7 is driven in response to receiving call signals. Then, the surface of the screen panel 2 is pressed against an ear, so as to allow the vibration of the screen panel 2 to be transmitted to the ear, rendering call audio audible.

With the above-described cell phone, in the area in the vicinity of the bone conduction vibrator 7, the cover panel 3 is not fixedly attached to the outer periphery of the screen panel 2, and the gap G is provided. This configuration allows for free vibration of the screen panel 2 within the gap G upon driving of the bone conduction vibrator 7. Thus, full bone conduction performance of the bone conduction vibrator 7 is achieved.

In fixedly attaching the first panel member 4 to the second panel member 5 by using the adhesive 60 in an assembly process, since the upright wall 52 is provided on the surface of the inner peripheral portion 51 of the second panel member 5, the upright wall 52 prevents the adhesive 60 from flowing out toward the inner peripheral portion 51 of the second panel member 5.

Moreover, since the anti-soil coating 21 is not provided in the outer peripheral area Y of the surface of the screen panel 2, the adhesive strength of the double-coated adhesive tape 6 is increased along the outer peripheral area, and the cover panel 3 is rigidly secured by the double-coated adhesive tape 6.

It should be appreciated that the structures of the portions of the present invention are not limited to the foregoing embodiment, and various modifications are apparent to those skilled in the art without departing from the spirit of the present invention as defined in the claims. For example, instead of the configuration in which the front cover panel 3 is fixedly attached to the screen panel 2 by the double-coated adhesive tape 6, the front cover panel 3 may be fixedly attached to the screen panel 2 by using an adhesive layer such as an adhesive.

The present invention is implementable not only with cell phones but also with various electronic devices including bone conduction vibrators.

DESCRIPTION OF REFERENCE CHARACTERS

1 Main body
2 Screen panel
21 Anti-soil coating
3 Front cover panel
4 First panel member
40 Inner peripheral portion
41 Inner peripheral edge
5 Second panel member
51 Inner peripheral portion
52 Upright wall
6 Double-coated adhesive tape
61 Missing portion
7 Bone conduction vibrator

The invention claimed is:

1. An electronic device comprising:
a main body;
a screen panel disposed on a surface of the main body and configured to display an image;
a frame-shaped cover panel disposed on the surface of the main body to cover an outer periphery of the screen panel;
a bone conduction vibrator incorporated in the main body and attached to a rear surface of the screen panel, the bone conduction vibrator being configured to transmit audio by bone conduction; and
an adhesive layer fixedly attaching the cover panel at a rear surface thereof to an outer peripheral portion of a surface of the screen panel,
wherein the adhesive layer extends along the outer peripheral portion of the surface of the screen panel and has a missing portion in which an area to be located in the vicinity of the bone conduction vibrator is missing, and the missing portion in the adhesive layer provides a gap between a portion of the outer peripheral portion of the surface of the screen panel and the rear surface of the cover panel.

2. An electronic device comprising:
a main body;
a screen panel disposed on a surface of the main body and configured to display an image;
a frame-shaped cover panel disposed on the surface of the main body to cover an outer periphery of the screen panel;
a bone conduction vibrator incorporated in the main body and attached to a rear surface of the screen panel, the bone conduction vibrator being configured to transmit audio by bone conduction; and
an adhesive layer fixedly attaching the cover panel at a rear surface thereof to an outer peripheral portion of a surface of the screen panel,
wherein the adhesive layer extends along the outer peripheral portion of the surface of the screen panel and has a missing portion in which an area to be located in the vicinity of the bone conduction vibrator is missing, and the missing portion in the adhesive layer provides a gap between the surface of the screen panel and the rear surface of the cover panel, and
wherein the gap has a dimension adapted to prevent the surface of the screen panel, to be vibrated upon driving of the bone conduction vibrator, from contacting a rear surface of an inner peripheral portion of the cover panel.

3. The electronic device according to claim 1, wherein the bone conduction vibrator is positioned on an outer side of an image display area of the screen panel.

4. An electronic device comprising:
   a main body;
   a screen panel disposed on a surface of the main body and configured to display an image;
   a frame-shaped cover panel disposed on the surface of the main body to cover an outer periphery of the screen panel;
   a bone conduction vibrator incorporated in the main body and attached to a rear surface of the screen panel, the bone conduction vibrator being configured to transmit audio by bone conduction; and
   an adhesive layer fixedly attaching the cover panel at a rear surface thereof to an outer peripheral portion of a surface of the screen panel,
   wherein the adhesive layer extends along the outer peripheral portion of the surface of the screen panel and has a missing portion in which an area to be located in the vicinity of the bone conduction vibrator is missing, and
   the missing portion in the adhesive layer provides a gap between the surface of the screen panel and the rear surface of the cover panel,
   wherein the cover panel includes a frame-shaped first panel member that covers the outer periphery of the screen panel, and a second panel member extending along a rear surface of the first panel member and fixedly attached to a rear surface of an inner peripheral portion of the first panel member by an adhesive, and
   wherein the second panel member has an inner peripheral portion extending further from an inner peripheral edge of the first panel member toward a central portion of the screen panel, and an upright wall is provided on a surface of the inner peripheral portion, the upright wall being higher than a surface on which the inner peripheral portion of the first panel member is fixedly bonded.

5. The electronic device according to claim 1, wherein an anti-soil coating is provided on the surface of the screen panel over a central area excluding an outer peripheral area in which the adhesive layer is present.

* * * * *